US008715050B1

(12) United States Patent
Booth et al.

(10) Patent No.: US 8,715,050 B1
(45) Date of Patent: May 6, 2014

(54) INTERACTIVE ELECTRONIC GAMING WITH MATCHED-TOURNAMENT GAME PLAY

(75) Inventors: Joe Booth, Vancouver (CA); Paul Christopher Hossack, Vancouver (CA); Matt Bilbey, Geneva (CH); Darren Hedges, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 1785 days.

(21) Appl. No.: 11/833,881

(22) Filed: Aug. 3, 2007

Related U.S. Application Data

(60) Provisional application No. 60/821,393, filed on Aug. 3, 2006.

(51) Int. Cl.
*A63F 13/00* (2006.01)
*A63F 13/12* (2006.01)

(52) U.S. Cl.
CPC ......... *A63F 13/12* (2013.01); *A63F 2300/5546* (2013.01); *A63F 2300/5566* (2013.01); *A63F 2300/5593* (2013.01)
USPC ................................................ 463/9; 463/42

(58) Field of Classification Search
CPC ................ A63F 13/12; A63F 2300/55; A63F 2300/5546; A63F 2300/5566; A63F 2300/5593; A63F 2300/8005
USPC ....................................................... 463/9, 42
See application file for complete search history.

(56) References Cited

U.S. PATENT DOCUMENTS

| 6,193,610 B1 * | 2/2001 | Junkin | 463/40 |
| 6,726,567 B1 * | 4/2004 | Khosla | 463/42 |
| 6,758,754 B1 * | 7/2004 | Lavanchy et al. | 463/42 |
| 8,002,618 B1 * | 8/2011 | Lockton et al. | 463/9 |
| 8,091,111 B2 * | 1/2012 | Logan et al. | 725/110 |
| RE44,095 E * | 3/2013 | Sanchez | 463/42 |
| 2002/0034980 A1 * | 3/2002 | Lemmons et al. | 463/40 |
| 2008/0311996 A1 * | 12/2008 | Belton et al. | 463/42 |

* cited by examiner

*Primary Examiner* — Michael Cuff

(57) ABSTRACT

An gaming system comprises a game server with which client systems can interact, wherein users play interactive games based on the users' team associations, wherein virtual matches between teams are determined, at least in part, by real-world league schedules, and wherein the gaming system presents game results by team for a league where the virtual match results for various teams in the league are determined by results of individual games played between users representing those teams while playing the games. Individual users for individual games can be associated with teams of their choice, assigned teams or assigned to teams that rival other teams that the users' preferred team is a rival of. The client systems can be computers, handheld devices, gaming consoles, or the like. The client systems can include local game code or could connect to a game server to obtain that functionality. In some implementations, the game is locally played without an intervening network. Using such a gaming system, community-based, aggregate-result driven tournaments can be organized.

20 Claims, 8 Drawing Sheets

LEAGUE:

| Position | Team Name | Games Played | Wins | Draws | Losses | Form |
|---|---|---|---|---|---|---|
| 1 | Man Utd | 38 | 29 | 8 | 1 | DDDDD |
| 2 | Chelsea | 38 | 27 | 10 | 1 | DWDWD |
| 3 | Arsenal | 38 | 19 | 18 | 1 | WDWDD |
| 4 | Everton | 38 | 19 | 16 | 3 | LWDDW |
| 5 | Middlesbrough | 38 | 18 | 10 | 10 | WWDDW |
| 6 | Man City | 38 | 16 | 13 | 9 | DDWWW |
| 7 | Tottenham | 38 | 15 | 15 | 8 | DWDDW |
| 7 | West Ham | 38 | 15 | 15 | 8 | DWWDW |
| 9 | Liverpool | 38 | 15 | 12 | 11 | WWWDL |
| 10 | Blackburn | 38 | 15 | 9 | 14 | DWWWW |
| 11 | Newcastle | 38 | 12 | 15 | 11 | LLLDD |
| 12 | Reading | 38 | 12 | 9 | 17 | DWWLW |
| 13 | Wigan | 38 | 12 | 6 | 20 | WLLDL |
| 14 | Bolton | 38 | 10 | 9 | 19 | WLLWD |
| 14 | Portsmouth | 38 | 11 | 6 | 21 | LLLLD |
| 16 | Aston Villa | 38 | 9 | 11 | 18 | LWLWL |
| 17 | Charlton | 38 | 7 | 9 | 22 | LLLDL |
| 18 | Watford | 38 | 6 | 6 | 26 | WLLLL |
| 19 | Fulham | 38 | 4 | 11 | 23 | LLLLL |
| 20 | Sheff Utd | 38 | 2 | 6 | 30 | LLWDL |

SCHEDULE:

| Home Team | Away Team | Start Date | Start Time | End Date | End Time |
|---|---|---|---|---|---|
|  |  |  |  |  |  |
|  |  |  |  |  |  |

FIG. 9

INTERACTIVE ELECTRONIC GAMING WITH MATCHED-TOURNAMENT GAME PLAY

CROSS-REFERENCE TO RELATED APPLICATIONS

The present disclosure may be related to the following commonly assigned applications/patents:

This application claims priority from U.S. Provisional Patent Application No. 60/821,393 filed Aug. 3, 2006 entitled "Interactive Leagues" which is hereby incorporated by reference, as if set forth in full in this document, for all purposes.

The respective disclosures of these applications/patents are incorporated herein by reference in their entirety for all purposes.

FIELD OF THE INVENTION

The present invention relates to interactive entertainment systems in general and in particular to gaming systems wherein play follows, at least in part, real-world league schedules, thus providing for games including community-based, aggregate-result driven tournaments.

BACKGROUND OF THE INVENTION

Real-world sporting events and teams tend to be organized in leagues. Generally, a league is a set of teams that play a series of sporting events according to league rules. Often, the league matches are grouped into seasons, such as annual periods during which matches are held. There exist soccer (football) leagues, baseball leagues, hockey leagues, and the like. Some fans can be supporters of one or more teams in a variety of leagues.

A team can comprise one or more players and often teams are associated with the cities in which they are based, the stadium or venue that is considered their home venue, their team colors and/or indicia, and in some cases teams have enduring personalities, coaches, owners and other aspects of the team that draws (or deflects) fans. While not departing from the definition of league herein, it should be understood that teams can be added or removed from a league, guest matches might exist (where a team not generally considered to be a member of a league plays a league match, typically on an irregular basis).

While not intending to be limiting, it should be understood that a match with real-world league comprises events, games, outings, rounds, scrimmages, etc. wherein two or more real-world teams come together to compete for a period of time (i.e., a match starts and at some point ends) and at the end of the match, there is an outcome, such as a score for the match, typically with one team being declared the winner of the match (or more than one team, for some leagues), or matches might end in a draw, forfeiture, delay or cancellation.

Typically, the start times/dates for matches among teams are set at the start of a league season or before and are published. Typically, the end times/dates for those matches is determined by the league rules (and possibly intervening events unrelated to the match) and the outcome of the match is determined by the league rules and the actions taken or not taken by the team or team members. For example, the Dodgeville soccer team plays the Smalltown soccer team at 3 PM on Saturday and the match ends when the game clock reaches "0:00" and the outcome is the total number of goals each team scored during that time period.

Fans associate with those teams. Fans may switch allegiances among teams and might even change allegiances to leagues altogether, choosing at times to support no teams while at other times choosing to support one or more teams in one or more leagues. Often, all that is required of a fan to have an allegiance to a team is to state a preference, although some fans will purchase clothing and other items with team indicia thereon, buy season tickets, regularly attend real-world matches of their favorite team, follow news of the team and its players, etc.

Quite often, sporting fans support teams that are based in or near the fans' home town or where they consider home. As a result, communities of interest often exist in real-world communities, wherein local fans support their local teams by attending matches and cheering on the team, by watching the matches on television or following matches in other media such as radio and networked computers (e.g., Internet media), by purchasing merchandise with the team logo and other ways. Sports fans identify themselves with their favorite teams and take pride in supporting those teams.

Real-world league events that are followed by fans are generally populated by teams with members that qualify for the events, such that not just anyone who is interested is able to join a team and play in the league. Thus, there are interested parties who would be excluded from actually participating in the event, except perhaps as a spectator. However, with virtual leagues, wherein at least part of the operations of the league are simulated in a virtual space, often anyone who signs up or buys a game can participate.

Some of these sports fans also play interactive games. The interactive entertainment industry publishes sports games wherein the teams in those sports games correspond to real-world teams. For example, the electronic soccer game FIFA 07 published by Electronic Arts of Redwood City, Calif., USA, provides sports fans with a chance to play a video game where they can control an animated version of their favorite team.

A desirable goal would be for a sports fan to leverage such game play in such a way as to show community support for his or her favorite teams.

BRIEF SUMMARY OF THE INVENTION

In accordance with an embodiment of the present invention, a gaming system comprises a game server with which client systems can interact, wherein users use their client systems coupled to the game server to play games between two or more users, wherein users specify the teams they will represent in an interactive league, wherein games that can be played are determined, at least in part, by real-world league schedules for matches, and wherein the gaming system presents match results by team for a league where the match results for various teams in the league are determined by results of individual games played between users representing those teams while playing the games.

The client systems can be computers, handheld devices, gaming consoles, or the like. The client systems can include local game code or could connect to a game server to obtain that functionality. In some implementations, the game is locally played without an intervening network.

Using such a gaming system, community-based, aggregate-result driven tournaments can be organized. Individual users for individual games can be associated with teams of their choice, assigned teams or assigned to teams that rival other teams that the users' preferred team is a rival of.

The following detailed description together with the accompanying drawings will provide a better understanding of the nature and advantages of the present invention.

BRIEF DESCRIPTION OF THE DRAWINGS

FIG. 9 illustrates an example of a league statistics display as might be presented to users of a gaming system according to an embodiment of the present invention.

DETAILED DESCRIPTION OF THE INVENTION

Figure 1:
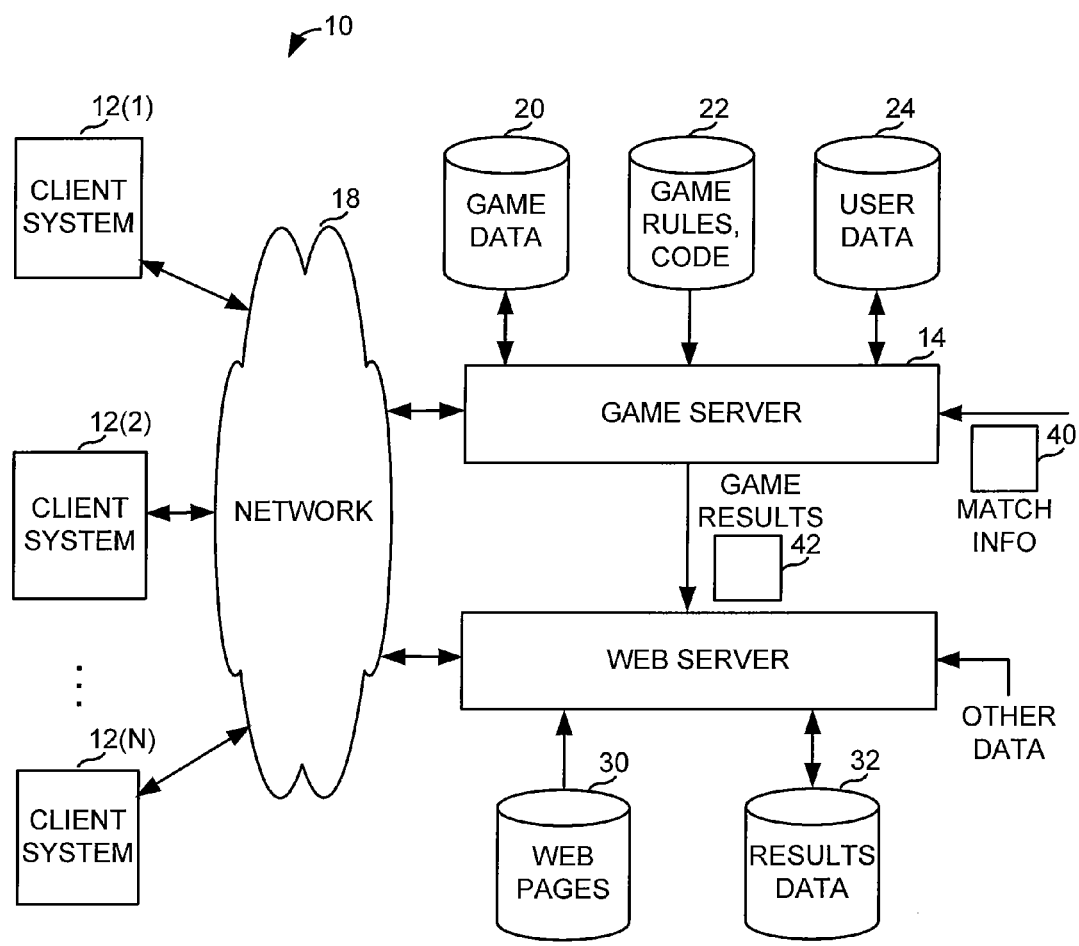
FIG. 1 is a schematic diagram of various elements that might make up a gaming system that provides for matched-tournament gaming, wherein interactive games are played according to matches in a tournament derived, at least in part, by real-world league schedules, in accordance with an embodiment of the present invention.

An improved gaming system is described herein. According to aspects of the present invention, community-based, aggregate-result driven tournaments can be organized.

In a specific example, soccer fans might each have allegiances to their favorite soccer team that plays matches in a soccer league according to a schedule set by the league management. Some of those fans would play matches in an interactive game (which can be online in that it is played over a network, but that need not be the case) against other fans, where the timing of the game is such that it is coordinated with the real-world schedule. This is referred to herein as matched-tournament gaming, wherein interactive games are played according to matches in a tournament derived, at least in part, by real-world league schedules.

For a specific example, if the weekend schedule for the league had team A playing team B and team C playing team D, then from Thursday, 5 PM to Sunday, 11 PM, fans of team A play interactive games against fans of team B and fans of team C play interactive games against fans of team D. After the last game is concluded (or possibly before), the game server determines an aggregated outcome for the pairing of teams A/B and teams C/D. In a specific example, the game server totals the number of games won by fans of team A and totals the number of games won by fans of team B and posts those totals as the score for the interactive version of the weekend match between teams A and B. In this manner, fans of a particular team can support them in the virtual world by playing games against fans of other teams to affect the outcome of virtual matches that correspond with real-world matches.

A real-world league is generally understood to include a collection of teams that fans and other interested parties follow as the teams play against each other, whereas a virtual league should be understood as a structure set up by a gaming system as part of interactions of users of the gaming system wherein games are played out in a virtual space (2D, 3D, etc.) simulated by the gaming system and played according to gaming system rules and user inputs, where the rules can be the same as the real-world rules or different rules, perhaps adapted to interactive game play. Often, the league matches are grouped into seasons, such as annual periods during which matches are held. There exist soccer (football) leagues, baseball leagues, hockey leagues, and the like.

For example, the gaming system rules might be embodied in game code that, when executed, causes a display to display to a user a view into a virtual three-dimensional model of a sports field, stadium, pitch, track, course, etc. As is well-known in the art of video games, the user's input can be used to control the outcome of the game and thus control the display that the gaming system provides in response to the user input. As used herein, "user" refers to a person (or a machine emulating the input of a person) that is playing a game on the gaming system, whereas "players" refer to the persons or entities that/who are part of the real-world team and are represented as simulated characters within the game generated by the gaming system.

The gaming system that presents the game (i.e., executes the game, receives user input and possibly other inputs, provides display output and possibly other outputs) can be a single machine, a networked plurality of machines and/or devices, coupled directly or over a network such as the Internet, or other variations. The coupling can be wired or wireless.

A gaming system is interactive if it responds in real-time to user input, or near enough to real-time that a typical user would judge it to be interactive. A gaming system is an online gaming system if the game can be interactively played by two or more players, typically players playing over a network or in remote locations.

As used herein, the term "team" can have broad meaning. A team can comprise one or more players, such as a team comprising an individual athlete or a plurality of athletes, or a team representing/comprising a country or a plurality of countries. A team can be a sports team for a wide variety of sports, but typically the sports teams used for the gaming system plays a sport that is amenable to having a corresponding virtual game. For example, there can be a real-world basketball team and a virtual basketball game.

An example of a team includes the twenty teams in the F.A. Premier League (English football). A user could associate with the Manchester United team. An example of the individual athlete team is an individual golfer in the PGA tour, such as Tiger Woods. An example of a country team is the US Olympic team. The type of competition does not need to be sports-related, and can include other competitive endeavors such as battles and wars. Examples of non-sports related competition include countries at war, where each country is a team, and different species battling each other, where each species operates as a team, e.g., elves vs. ogres, etc.

Often teams have, in addition to a name and players, a city or region in which they are based, the stadium or venue that is considered their home venue, team colors and/or indicia, personalities, coaches, owners and other aspects. Some users might be fans of teams based on those aspects, such as rooting for the hometown team or rooting for the school that the user attends or attended.

The present invention need not be limited to particular sports, but the gaming system described herein might host virtual games for the sports of soccer, football, baseball, running, golf, racing, skiing, battle, strategy, basketball, boating, etc. where there are corresponding real-world teams that users can associate with.

Some fans can be supporters of one or more teams in a variety of leagues. While not departing from the definition of league herein, it should be understood that teams can be added or removed from a league, guest matches might exist (where a team not generally considered to be a member of a league plays a league match, typically on an irregular basis).

A real-world match between two (or more) teams is an event that is scheduled. A tournament comprises one or more virtual matches, typically corresponding to a scheduled event, i.e., when two particular real-world teams play in a scheduled event, there is a virtual match that corresponds to that scheduled event. As explained below, the outcome of a virtual match depends, at least in part, on the results of individual interactive games played among users of the gaming system, in particular the results of games among users who have associated themselves with the teams that "play" in the virtual match. Of course, where the league is such that individual players play their best without having a specified opponent, then perhaps the interactive game involves only one user playing the virtual game.

A user can associate with a team in the gaming system and this information is stored as user preferences for that user. In effect, this provides a user with the ability to take an associated virtual team into online competition against another virtual team. The gaming system might allow for any user to play any team against any other team at any time, but more typically matched-tournament gaming comprises a plurality of games between users organized by the gaming system so that one user plays a game with another user during a time period that is determined, at least in part, by when the teams associated to those two users are scheduled for a real-world match. For example, where user U1 has associated with team X (e.g., user U1 indicated to the gaming system that user U1 is a fan of team X) and user U2 has associated with team Y and real-world teams X and Y are scheduled for a sporting event next Saturday afternoon, uses U1 and U2 can play against each other in an interactive game during that Saturday, during the preceding week, during that weekend, etc., and have the result of that interactive game count towards the tournament outcome. The gaming system can set the particular time period that does not need to align exactly with the start and end of the real-world match.

Fans may switch allegiances and so too with users of the gaming system. In fact, it might be possible for users of the gaming system to input an allegiance with a team without being a fan of that team, but merely a desire to play games on the gaming system as a user associated with that team. A user might input the user's preference for team association, electing to be associated with a particular team based on user preferences, or the user might be assigned to a team based on various criteria such as whether or not a virtual team needs associated members, whether or not the user's skills match up with a particular team, etc. The user could be assigned to a team arbitrarily or even randomly.

Once a user is associated with a team, this arrangement need not be permanent, but could change if the game rules embodied in the game code of the gaming system allow for it. In such cases, users could switch their association based on rules set up by a tournament organizer, the programmer of the game code or an administrator of the gaming system. Alternatively, users' associations can be switched through the user's choice or by acquiescing to recruitment efforts from other teams.

For example, a user who is unable to get onto the team of his choice (i.e., not allowed by the game rules to be associated with the team the user initially requests an association with) for some reason, could elect to be associated with another team that shares the same rival with the user's first choice. So, even though that user would not be playing for his or her favorite team, he or she would have the opportunity to play for a team that has similar loyalties with respect to rival teams. This rivals-based association technique is described in further detail below. For some embodiments, team changing is limited, such as limited to one change per season.

Multiple users can be associated to the same team. The number of users associated with a team can be arbitrary. For example, the number of users associated with a team can be based on how many users sign-up to play with the gaming system. Where the gaming system is a client-server system coupled over the Internet, there might be large numbers of users. The number of users per team could be controlled at the tournament organizer's discretion or choice and implemented by the organizer providing corresponding administrator inputs to the gaming system. Each team might be allowed different numbers of users and a team could have zero users. In the case where a team has no users associated with it, the opposing team could be matched up with an artificial intelligence (AI) team that is part of the gaming system, or might not match up at all. In that manner, a team need not be eliminated from a tournament due to lack of human users associated with that team. For example, at the start of a tournament before the first user signs up, each of the teams could be user-less. Users could then be added to the teams as the users sign up and are associated with teams.

The figures will now be described with reference to example embodiments of such a gaming system and its components and example processes performed by, using or within the gaming system. In the examples shown in the figures, the gaming system is a client-server based online interactive video game system, but the invention need not be construed in so limited a manner.

FIG. 1 is a schematic diagram of various elements that might make up a gaming system 10 that provides for matched-tournament gaming, wherein interactive games are played according to matches in a tournament derived, at least in part, by real-world league schedules. Gaming system 10 is shown comprising client systems 12(1), 12(2), ..., 12(n) (n being arbitrary or determined), coupled to a game server 14 and a web server 16 via a network 18. Network 18 can be the Internet. The coupling can be using a network protocol, such as TCP/IP, HTTP or other protocol. Game server 14 and web server 16 can be an integrated system, or separate systems, or separate systems that appear to clients as an integrated system.

Also shown there coupled to game server 14 is game data storage 20, game code storage 22 wherein game code provides instructions for execution of the game and typically is used to implement the game rules, and user data storage 24 that maintains data about the users of the gaming system. Web server 16 is shown coupled to web page storage 30 and game results data storage 32. It should be understood that the various data storage elements shown might be separate or integrated with other data storage and can have various structures, or even be unstructured data. For example, it can be stored as a database, as XML files, as text, or other data formats. It should also be understood that while the indicated direction of data flow for couplings between storage elements and processing elements, and between two or more processing elements, might be shown by example in the figures, additional flows should not be ruled out and not all flows might be required.

In an example operation, client systems 12 interact with game server 14, such as by requesting a match-up with another client system for a game. Game server 14 receives match information 40, which might be from a news source, league publication and/or manual entry, or other source. Game server 14 also reads game data storage 20 and game code storage 22 to execute the game (in the case of server-executed games) or to provide to the client (in the case of downloaded games). In some cases, game server 14 only needs enough information for allocating users to games and maintaining user data, while the client systems maintain the game data and game code. Game server 14 maintains user data in storage 24 to, for example, update user statistics, team associations, log-in fields, etc.

As games are played and game server 14 tracks the game results, game server 14 might provide game results 42 to web server 16. What are provided might be individual game results, virtual match results, real-world match results, and/or other data, or merely the data needed to render a web page informing others of the results. With that information, web server 16 can serve up pages having that information thereon as requested by users with their client systems or others as well. Web server 16 might store published results data in storage 32 for real-world matches, virtual matches or other information for populating web pages on the fly.

Figure 2:
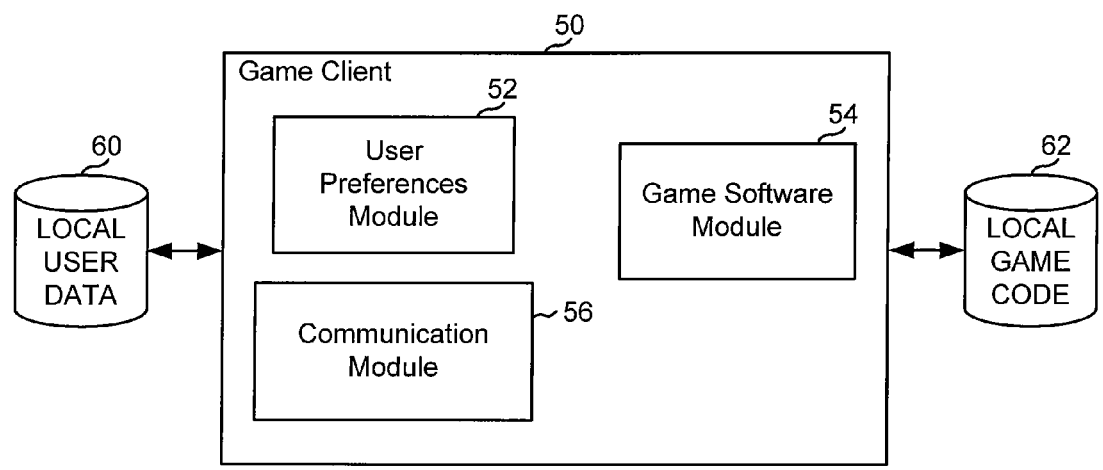
FIG. 2 is a block diagram illustrating some elements of a game client that might be used in the gaming system of FIG. 1.

FIG. 2 is a block diagram illustrating some elements of a game client 50 that might be used as the client system in the gaming system of FIG. 1. As shown, game client 50 comprises a user preferences module 52, a game software module 54 and a communication module 56. Game client 50 can read local game code from storage 62 and might also write game code to storage 62, such as when downloading a game. User preferences module 52 might interact with storage 60 for local user data.

Game code, user data, and/or preferences might exist solely locally, solely centrally, part local-part central, and/or duplicated in whole or part. Communications between the game client and a game server might be accomplished by any means known in the art, including, for example network communication over the Internet, communication over wireless connections, communication over direct connections, etc.

Figure 3:
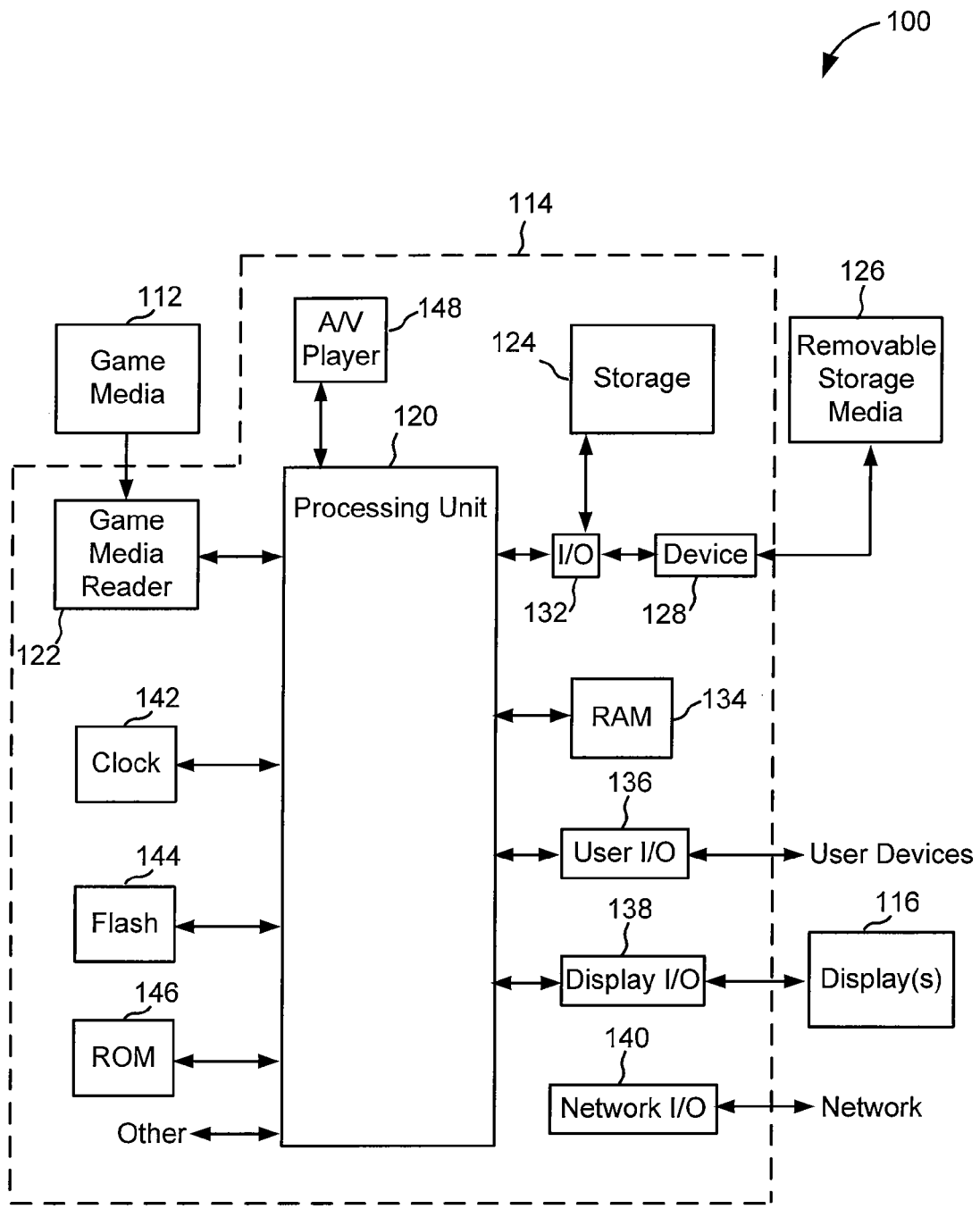
FIG. 3 is a hardware block diagram illustrating some hardware components that might be used to implement a game device that could be used in a gaming system in accordance with an embodiment of the present invention.

FIG. 3 is a hardware block diagram illustrating some hardware components that might be used to implement a game device 100 that could be used in a gaming system in accordance with an embodiment of the present invention. Other elements not shown might be included.

As an example, game device 100 might include a computing element 114 such as a game console, such as a PS2™ console or an Xbox™ console. However, it should be understood that other variations of computing element 114 may be substituted for the examples explicitly presented herein. As shown, computing element 114 includes a processing unit 120 that interacts with other components of computing element 114 and also interacts with external components to computing element 114. A game media reader 122 is included that communicates with game media 112. Game media reader 122 may be a CDROM or DVD unit that reads a CDROM, DVD, or any other reader that can receive and read data from game media 112.

Computing element 114 also includes various components for enabling input/output, such as an I/O 132, a user I/O 136, a display I/O 138, and a network I/O 140. I/O 132 interacts with a storage 124 and, through a device 128, removable storage media 126 in order to provide storage for computing element 114. Processing unit 120 communicates through I/O 132 to store data, such as game state data and any shared data files. In addition to storage 124 and removable storage media 126, computing element 114 includes random access memory (RAM) 134. RAM 134 may be used for data that is accessed frequently, such as when a game is being played.

User I/O 136 is used to send and receive commands between processing unit 120 and user devices, such as game controllers. Display I/O 138 provides input/output functions that are used to display images from the game being played. Network I/O 140 is used for input/output functions for a network. Network I/O 140 may be used if a game is being played online or being accessed online.

Computing element 114 also includes other features that may be used with a game, such as a clock 142, flash memory 144, read-only memory (ROM) 146, and other components. An audio/video player 148 is also used to play a video sequence such as a movie. It should be understood that other components may be provided in computing element 114 and that a person skilled in the art will appreciate other variations of computing element 114.

Figure 4:
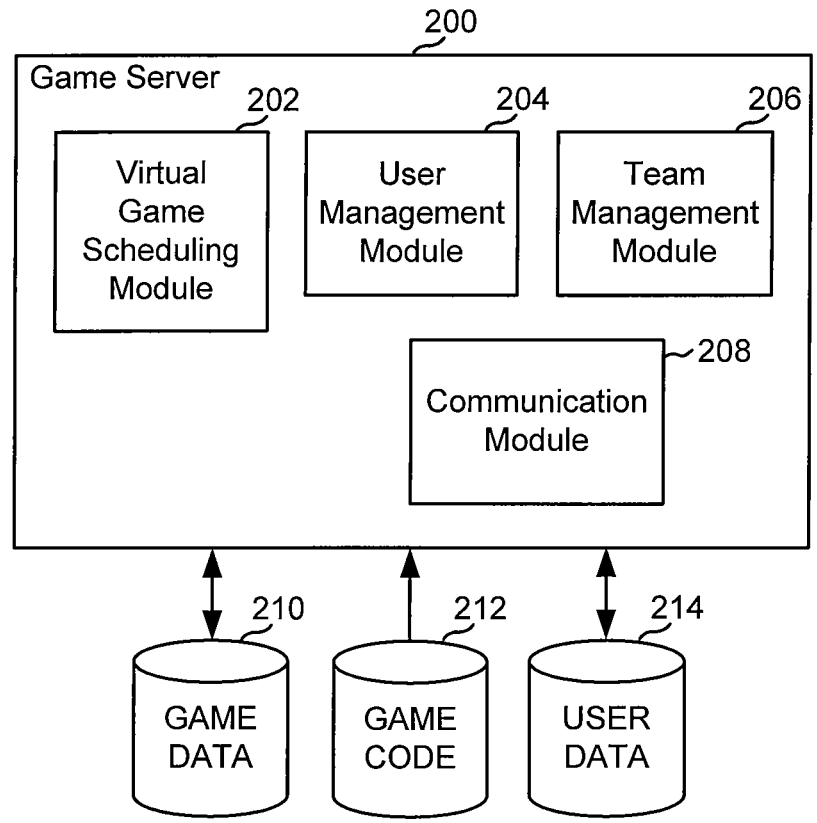
FIG. 4 is a block diagram illustrating some elements of a game server that might be used in the gaming system of FIG. 1.

FIG. 4 is a block diagram illustrating some elements of a game server 200 that might be used in the gaming system of FIG. 1. As shown, game server 200 comprises a game scheduling module 202, a user management module 204, a team management module 206 and a communications module 208 and also interacts with storage 210 for game data, storage 212 for game code/rules, and storage 214 for user data. Further details are provided elsewhere herein. Game code, user data, and/or preferences might exist solely centrally on game server 200, but might be stored on clients, or part client-part server, and/or duplicated in whole or part.

Figure 5:
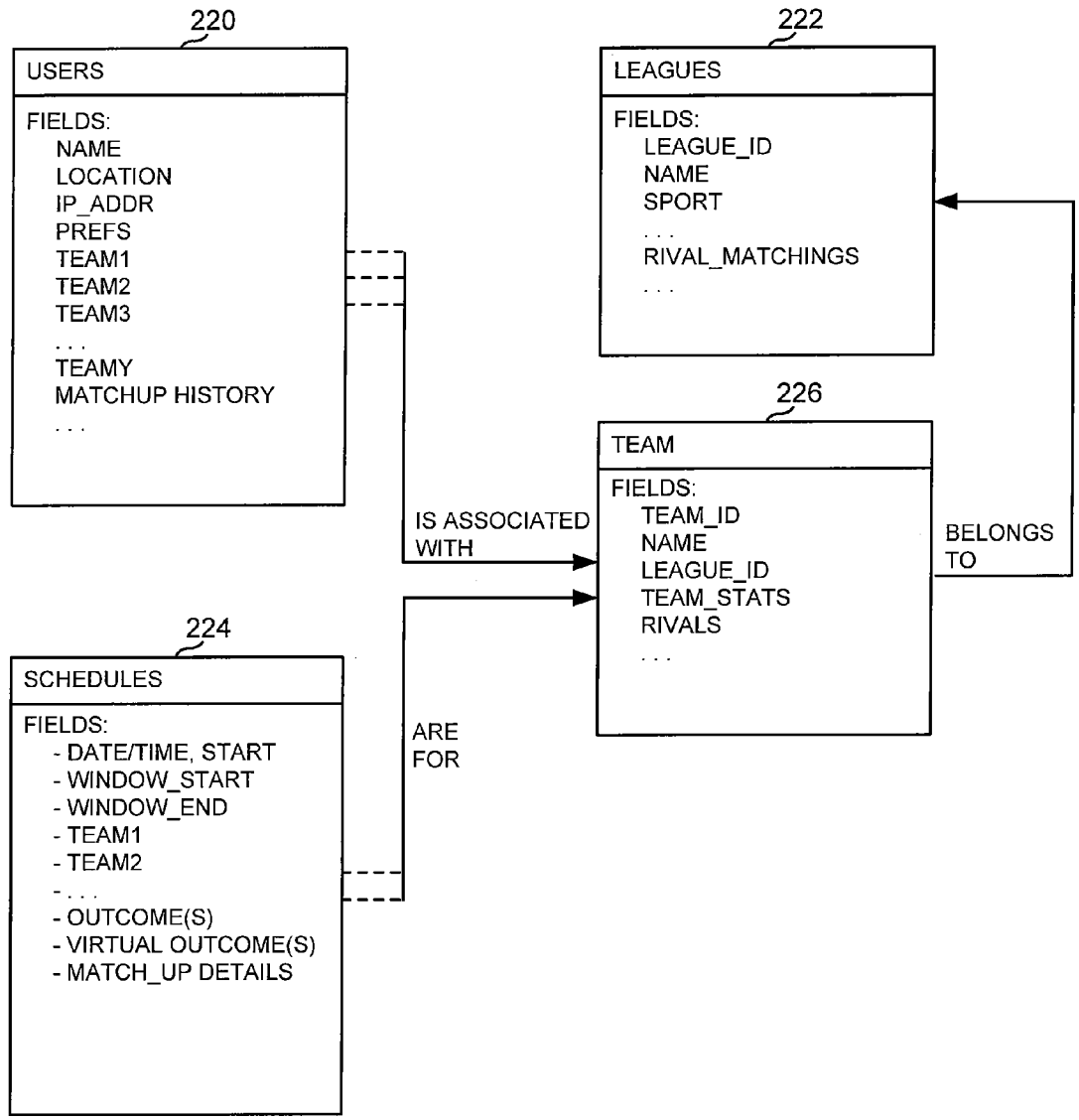
FIG. 5 is a block diagram of data structures that might be used by a game client and/or a game server to support and/or implement features of the in the gaming system in accordance with an embodiment of the present invention.

FIG. 5 is a block diagram of data structures that might be used by a game client and/or a game server to support and/or implement features of the in the gaming system. Variations other than those shown, but that still allow for implementation of various features described herein, might be used instead. However, as shown, the data comprises a user list 220, a league list 222, a schedules list 224 and a team list 226. In this example, each user on user list 220 might be associated with one or more team from team list 226, each team on team list 226 might belong to a league on league list 222 and teams on team list 226 have schedules that are represented in schedules list 224.

Figure 6:
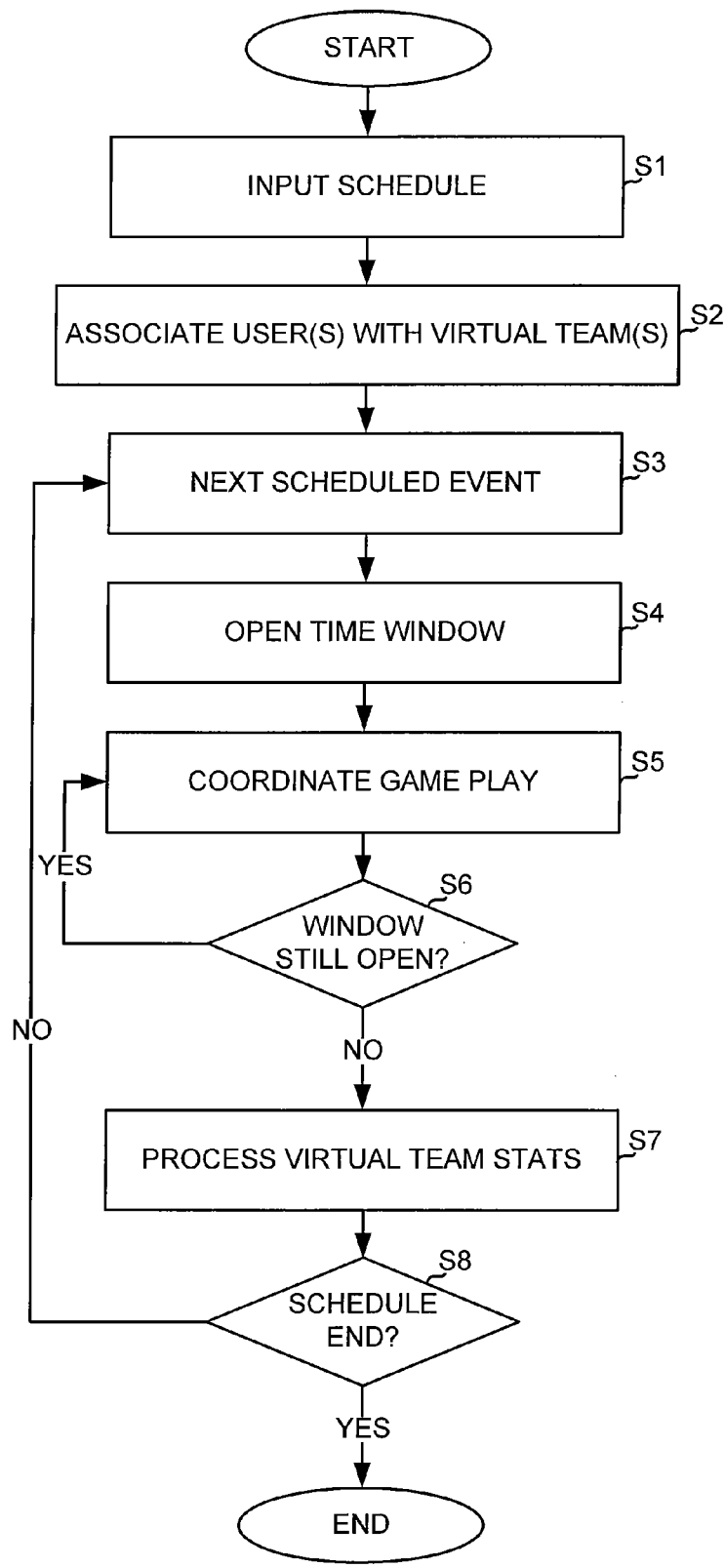
FIG. 6 is a flowchart of a process for managing a tournament using a gaming system. It should be noted that while the steps of flowcharts are labeled S1, S2, . . . , the order of the steps need not always follow the label order, unless otherwise specified.

FIG. 6 is a flowchart of a process for managing a tournament using a gaming system. The process might start with step S1, wherein a league match schedule is input. In step S2, users are associated with teams (described elsewhere herein)—this can be done before or after the schedule is input. When a next scheduled event occurs (S3) or the current time is some relationship with the next scheduled event (e.g., a few days before), a game play window is opened (i.e., the game server then allows games to be played with respect to the teams for which the window is opened) (S4) and game play is coordinated (S5). In some sports, there are enough teams such that at any given time there are many teams playing at once. In such cases, there might be many game play windows open at once. In some cases, there might even be more game play windows open than there are real-world matches, such as where real-world matches are played each day but the game play windows are three days wide.

The game server may periodically check if a game play window is open or closed (S6), allowing for more game play coordination if it is open, or proceeding to process virtual team statistics (S7) if it is not. The game server might then check if the league is done with its matches (S9), perhaps by consulting the input league match schedule. If yes, then the tournament ends, otherwise, the game server goes back to process the next scheduled event (S3).

In this manner, a game schedule is input, a user is associated with a virtual team and a game play window is opened for each match in the schedule, as dictated by the timing defined in the schedule (e.g., one match for each real-world football match, where each virtual league match opens three days before the real match and closes at kick-off time of the real match, for example). While the window is open, the users play games and the user's play statistics, such as game final scores, are tracked. When the window for a virtual match closes, virtual team statistics are determined and then posted for all of the users in the community to see.

This game play window can depend on various criteria, such as the type of game being played and the decisions made by a tournament organizer who can provide the results of those decisions to the game server via an organizer input. For example, a window for a casual games tournament is likely to be shorter, for example, on the order of minutes, than the window for leagues play, which might be on the order of days. The schedule could be fictional or could follow real-world events such as the schedule for The F.A. Premier League. For example, the game schedule might be manually input and might be independent of the real-world league match schedule.

During the game play window for a match between two teams, users associated with those two teams can play against each other in interactive games. Both users can play as their own team. A user can search for any appropriate opponent and be automatically matched against a different user who is associated with the opposing team. In a given game play window between two teams, each user on either team can play zero, one or multiple versions of this match while the game play window is open, depending on game rules. Users generally are restricted from playing official games for this match before the game play window opens or after it closes, but might be allowed to play unofficial games. Games played during the window may not be counted if they are not identified as official games.

Figure 7:
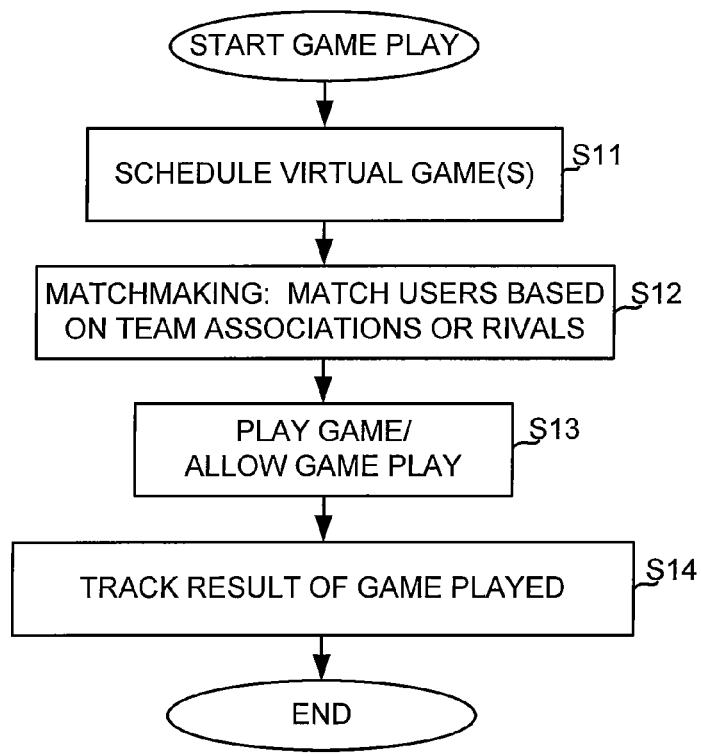
FIG. 7 is a flowchart of a process for coordinating interactive games using a gaming system.

FIG. 7 is a flowchart of a process for coordinating interactive games using a gaming system. This process might be used as the process of step S5 indicated in FIG. 6. The process includes scheduling virtual games (S11), matchmaking (matching users based on their team associations) (S12), playing a game or allowing for game play (S13), and tracking results of the game played (S14).

In the context of matchmaking, "rivals matching" can be applied to associate a user with a particular team. Specific matchings might occur based on the schedule, i.e., the schedule defines the potential "team vs. team" matches that users can play toward. The user vs. user interactive games can be played with two teams that are defined in the schedule. Typically, the schedule is aligned with a real-world league schedule.

Examples of matchmaking will now be described. For a "Play As Your Club" mode, a user associated to team A is matched into a scheduled match involving team A against another team where the user will control team A and play against a different user controlling team A's opponent. Another mode is the "Play Against Your Team's Rival" mode, which is useful when there is an imbalance of users.

The game rules might specify that a particular league only allows a certain number of rival teams to be associated as rivals of a given team. A team could have zero, one or many rival teams. Conceptually, a rival team to team A is another team in team A's league that supporters of team A would like to see lose. Technically, a rival team is simply another team in the league, but a rival can also be defined as a team that a user (e.g., sports fan) would particularly like to see lose. By providing a means for a user to associate himself or herself temporarily with another team that has a match against his or her original club's rival, more options are available for getting game play time in a tournament. For example, if the user's favorite team (team A) does not have any open slots for play, the user can select to be associated with another team (team B) that has an open slot available in a match against one of team A's rivals (team C), and can thus help that other team (team B) beat the user's team's rival (team C) in a different game and/or tournament. In some embodiments, a constraint against changing teams might be relaxed to allow switching to a rival's rival but not another unrelated team.

A user associated with team A can be matched into a scheduled game involving one of team A's rival team where the team A user will control the team playing against team A's rival and play against a different user controlling team A's rival. For example, assume a league that contains all 20 teams from The F.A Premier League (English soccer league). This league includes teams such as Manchester United, Manchester City, Arsenal and Chelsea.

Manchester United's rival can be defined as Manchester City. In other words, Manchester United fans would love to see Manchester City lose their matches. Suppose that windows for two matches are open: 1) Manchester United vs. Arsenal and 2) Manchester City vs. Chelsea. If a Manchester United user is looking for a interactive leagues game to play, in the "Play As Your Club" mode, the Manchester United fan would play as Manchester United against another user controlling Arsenal, whereas in the "Play Against Your Team's Rival" mode, the Manchester United fan would play as Chelsea against another user controlling Manchester City. The Manchester United user would be trying to "stick one to Manchester City" by trying to hand Manchester City a loss.

One reason why a tournament organizer would allow users to match up against their rivals is to deal with a situation where users are not evenly distributed across teams. Rival matches provide more opportunities to play if the rivals are set up correctly.

Figure 8:
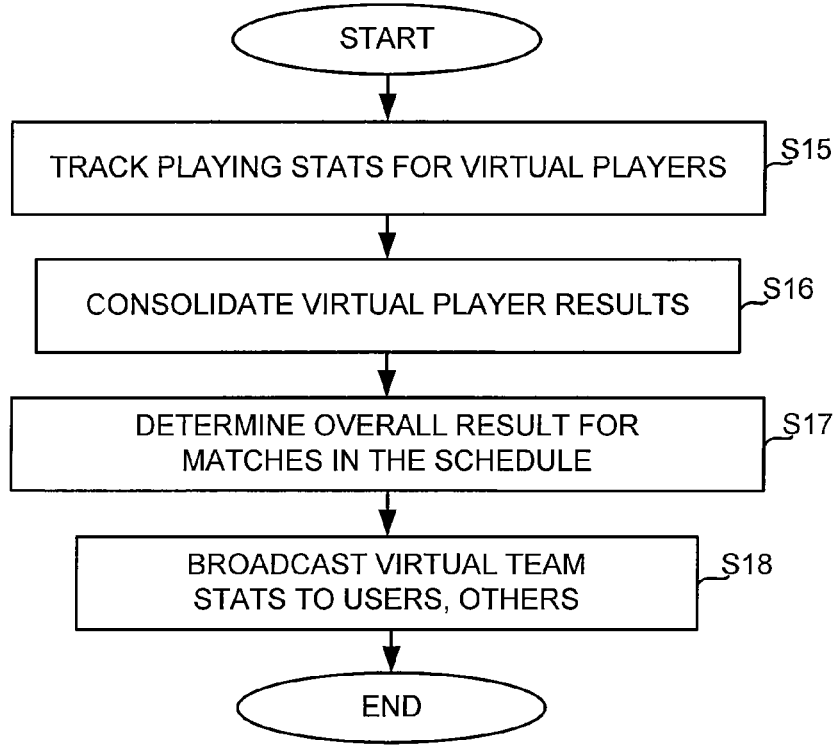
FIG. 8 is a flowchart of a process for processing virtual team statistics as part of a tournament.

FIG. 8 is a flowchart of a process for processing virtual team statistics as part of a tournament. The process might be used as the process of step S7 indicated in FIG. 6. The process includes tracking the playing statistics for virtual players (S15), consolidating play results (S16), determining overall results for matches in the schedule (S17), and broadcasting virtual team stats to the users (S18).

In certain embodiments, results of all games of a given match-up are tracked on the game server. Once the game play window for a given virtual match in the schedule closes and results from all on-going games are submitted or a certain amount of time passes, results from the games are summed together or some other aggregation is done. Aggregation might be other than by summing and might have different game results unevenly weighted. For example, a win by a user associated with team A might give team A one point, or the points given might depend on how much the user won the game by and/or the user's status.

The aggregate is used to decide the overall result of the match, i.e., where team A was scheduled against team B, did team A win, lose or tie with team B? The percentage of wins, losses and ties needed to decide the results can be determined by the tournament organizer and input to the system. To win, a team might need 50%+1 win, or might need over 60% of the wins (e.g., if they were the stronger team statistically, this might be fair). The results from a collection of match-ups of users for games can be from one particular computer game platform (e.g., PS2™ consoles) or combined from multiple computer game platforms participating in the same league (e.g., PS2™+Xbox™+PC+Xbox 360™+PSP™). The aggregate results decided after each virtual match might up translate into the overall standings of each team and/or determine the teams' success and future matches (e.g., play-offs, eliminations, etc.). This could drive a league standings table, a playoff structure, a competitive ladder, etc.

FIG. 9 illustrates an example of a league statistics display as might be presented to users.

Using the gaming system that has now been described, fans can represent their favorite teams or clubs online (or represent a rival of their rival), playing interactive games that correspond to real-world teams/clubs. The results of games between users are aggregated to arrive at the teams' interactive league performance for the corresponding virtual match between those teams. This provides a way for fans to support their team or teams online, playing virtual games corresponding to real sports matches against fans of opponent teams. This allows for fun, interactive game play and online community building as communities of users get together behind their teams and move them up in the rankings.

A user associated with a team will play an interactive game against a user associated with another team within a playing window that is determined, at least in part, by the schedule of when those two teams play each other in real-world events, such as the days leading up to the real match. Users might play as many games as they can during that window leading up to the real match. When the game play window closes, the results of the match or matches are compiled based, at least in part on the results of individual games. Each game won by a user might count towards the total points assigned to their team for that virtual match, and the team with the most points wins the virtual match corresponding to the real-world match. In this manner, a virtual tournament is played for the league.

With the gaming system, users can interact with other players in their community by sending messages, etc. and can see statistics of who is supporting which teams and who is online (i.e., connected to the game server). The gaming system might also include "lobby" functionality to allow users to interact outside the game to chat, arrange matches, etc.

A user might choose their preferred team, or a rival of a rival of their preferred team (or both), or a user might choose a less populated team, so as to have more opportunities to be matched against users associated with a more populated team. For a match-up between two teams, the users on the team with more user members might have fewer games to play against the users on the team with fewer members, who would be in more demand.

The gaming system might include a web interface to provide league information on web pages, such as a posting of a web page with a leader board listing the teams' ranking, which users contributed to which rankings, etc., and a web page with the schedule for virtual matches and real-world sporting events (matches). The schedule for each league is typically set at the start of the season, but might be updated if matches are rescheduled.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a gaming system wherein a server coordinates games played between two or more client systems and records results, a method of operating a computer game league tournament, comprising:

reading in, at the server, a league match schedule, wherein the league match schedule specifies when matches are to occur for real-world teams playing a sport and between which real-world teams, the league comprising a plurality of real-world teams and the league match play schedule including specification of at least one real-world league match;

associating a plurality of users, as virtual players of the sport, with a plurality of real-world teams, wherein at least a first user is associated with a first real-world team and a second user is associated with a second real-world team; and determining a game play window for playing the sport, at least in part in accordance with the league match schedule, wherein a game play window is used by the gaming system to determine when the first user can play an interactive game against the second user based on when the first real-world team and the second real-world team are scheduled for a match in the league match schedule.

2. The method of claim 1, further comprising:

associating a plurality of first users with the first real-world team;

associating a plurality of second users with the second real-world team; and aggregating interactive game play results such that individual game results of the plurality of first users and the plurality of second users contribute to results for a virtual match corresponding to the at least one real-world league match.

3. The method of claim 1, wherein the game server closes the game play window according to the league match schedule and game rules.

4. The method of claim 1, further comprising:

aggregating interactive game play results from a plurality of games played by users, wherein the aggregation is by team associations of those users; and determining virtual match results among two or more of virtual teams representing the corresponding real-world teams based, at least in part on results of the aggregating.

5. The method of claim 4, wherein the aggregate result for a first virtual team is the number of the first virtual team wins of interactive games played by users associated with the first real-world team and the aggregate result for a second virtual team is the number of the second virtual team wins of interactive games played by users associated with the second real-world team.

6. The method of claim 4, wherein aggregating the at least one individual game results into an aggregate result is independent of the team associations of the users.

7. The method of claim 1, further comprising the gaming server coordinating unscheduled games between users, wherein an unscheduled game is a game that is not dictated by the league match schedule.

8. The method of claim 1, further comprising coordinating a game between a first user associated with a first virtual team representative of the first real-world team and a second user associated with a second virtual team representative of the second real-world team even if there is no game play window open for a match-up of the first real-world team and the second real-world team, but there is a game play window open for a match-up of a third real-world team and the second real-world team, wherein the first user is associated for the match-up with the third real-world team if the third real-world team and the first real-world team are both rivals of the second real-world team as determined by a rivals listing available to the gaming system.

9. A method for operating an interactive leagues tournament using a gaming system, comprising:
 determining a league game play schedule using the gaming system, wherein the league includes at least three real-world teams playing a sport and the league game play schedule includes at least one league game;
 associating, by the gaming system, a first user, as a virtual player of the sport, with a first real-world team;
 determining, by the gaming system, at least one rival real-world team, wherein the rival real-world team is predetermined in accordance with rival criteria associated with the first real-world team;
 determining, by the gaming system, that the league game play schedule includes a game between the rival real-world team and an opponent real-world team;
 associating, by the gaming system, the first user with the opponent real-world team of the rival real-world team;
 associating, by the gaming system, a second user, as a virtual player of the sport, with the rival real-world team;
 opening a game play window for playing the sport used by the gaming system, in accordance with predetermined scheduling criteria, wherein the first user plays at least one individual game against the second user and wherein the first user is associated with an opponent virtual team representative of the opponent real-world team and the second user is associated with a rival virtual team representative of the rival real-world team;
 compiling, by the gaming system, the results of the at least one individual game;
 closing, by the gaming system, the game play window in accordance with the predetermined scheduling criteria; and
 aggregating, by the gaming system, the at least one individual game results into an aggregate result, wherein the aggregate result is representative of a league match result between the opponent virtual team and the rival virtual team, and wherein the first user's game play has an effect on the league match play standings of the rival virtual team and the aggregate result is used, at least in part, to determine a tournament outcome.

10. The method of claim 9, wherein the aggregate result for the opponent virtual team is the number of opponent virtual team wins and the aggregate result for the rival virtual team is the number of rival virtual team wins.

11. The method of claim 10, wherein the aggregate result for the opponent virtual team is added to the aggregate result for a first virtual team representative of the first real-world team, thereby decreasing the likelihood that the rival virtual team will win the tournament.

12. The method of claim 9, wherein associating the first user with the opponent real-world team of the rival real-world team is temporary.

13. The method of claim 9, wherein aggregating the at least one individual match results into an aggregate result is independent of the team associations of the users.

14. The method of claim 9, wherein:
 a plurality of first users are associated with the opponent virtual team;
 a plurality of second users are associated with the rival virtual team; and
 the aggregate result includes the compiled individual game results of the plurality of first users and the plurality of second users, wherein plurality of first users have an effect on the league match standings of the rival virtual team.

15. A method for operating an interactive leagues tournament for implementation within a gaming system, the method comprising:
 determining a league match play schedule using the gaming system, wherein the league includes at least two real-world teams playing a sport and the league match play schedule includes at least one league match;
 associating a first user, as virtual players of the sport, with a first virtual team representative of a first real-world team;
 associating a second user, as virtual players of the sport, with a second virtual team representative of a second real-world team;
 associating a third user, as virtual players of the sport, with the first virtual team;
 associating a fourth user, as virtual players of the sport, with the second virtual team;
 opening a game play window for playing the sport using the gaming system, in accordance with predetermined scheduling criteria, wherein the first user plays at least one individual game against the second user and the third user plays at least one individual game against the fourth user;
 compiling the results of the at least one individual game between the first user and the second user;
 compiling the results of the at least one individual game between the third user and the fourth user;
 closing the game play window in accordance with the predetermined scheduling criteria;
 aggregating the at least one individual game results into an aggregate result for the first virtual team; and
 aggregating the at least one individual game results into an aggregate result for the second virtual team.

16. The method of claim 15, wherein the aggregate result for the first virtual team is the number of first virtual team wins and the aggregate result for the second virtual team is the number of second virtual team wins.

17. The method of claim 15, wherein aggregating the at least one individual game results into an aggregate result is independent of the team associations of the users.

18. In a gaming system wherein a server coordinates games played between two or more client systems and records results, a method of operating a computer game league tournament, comprising:

reading in, at the server, a schedule that specifies when matches are to occur between which teams of a league, the league comprising a plurality of real-world teams playing a sport;

associating a plurality of users, as virtual players of the sport, with a plurality of virtual teams, each virtual team representative of a corresponding real-world team, wherein at least a first user is associated with a first virtual team corresponding to a first real-world team and a second user is associated with a second virtual team corresponding to a second real-world team; and determining a game play window for playing the sport, at least in part in accordance with the schedule, wherein a game play window is used by the gaming system to determine when the first user can play an interactive game against the second user based on when the first real-world team and the second real-world team are scheduled for a match in the schedule.

19. The method of claim 18, wherein the schedule is derived in part from a league match schedule and in part independent of the league match schedule.

20. In a gaming system wherein a server coordinates games played between two or more client systems and records results, a method of operating a computer game league tournament, comprising:

reading in, at the server, an indication of a plurality of real-world teams playing a sport that are members of a league, wherein the real-world teams play matches against each other according to league match rules;

associating a plurality of users, as virtual players of the sport, with the plurality of real-world teams, wherein at least a first user is associated with a first real-world team and a second user is associated with a second real-world team; and determining a game play window for playing the sport used by the gaming system to determine when the first user can play an interactive game against the second user based on when the first real-world team and the second real-world team are scheduled for a match in the league schedule.

* * * * *